United States Patent [19]

Aspden

[11] E Re. 31,557

[45] Reissued Apr. 17, 1984

[54] ELECTRICAL SWITCHES

[75] Inventor: David Aspden, Burnley, England

[73] Assignee: Lucas Industries Limited, Birmingham, England

[21] Appl. No.: 261,456

[22] Filed: May 7, 1981

Related U.S. Patent Documents

Reissue of:

[64] Patent No.: 4,245,141
Issued: Jan. 13, 1981
Appl. No.: 63,400
Filed: Aug. 3, 1979

[30] Foreign Application Priority Data

Aug. 11, 1978 [GB] United Kingdom ..... 33070/78

[51] Int. Cl.[3] ..... H01H 19/14

[52] U.S. Cl. ..... 200/314; 200/316

[58] Field of Search ..... 200/314, 310, 313, 316, 200/318, 324, 327, 328, 156, 153 B, 153 E

[56] References Cited

U.S. PATENT DOCUMENTS

| | | | |
|---|---|---|---|
| 2,273,353 | 2/1942 | Harris | 200/314 |
| 2,744,185 | 5/1956 | Cawley | 200/316 |
| 2,786,904 | 3/1957 | Hewes et al. | 200/316 |
| 3,215,806 | 11/1965 | Arnold et al. | 200/316 |
| 3,867,596 | 2/1975 | Schadow | 200/328 |

*Primary Examiner*—Willis Little
*Attorney, Agent, or Firm*—Holman & Stern

[57] ABSTRACT

An electrical switch comprises a body, including a base, an operating member supported by the body for rotational and axial movement relative thereto, an aperture extending through the base and a light source support member received in said aperture. The support member and the wall of the aperture are so shaped that the support member can be located in the base in either of first and second different axial positions relative to the base. The support member includes a blocking element, which in the first axial location of the support member relative to the base extends into the path of either axial or rotational movement of the operating member relative to the body to prevent such movement of the operating member relative to the body. The second location of the support member relative to the base is such that said blocking element lies out of the path of either axial or rotational movement of the operating member so that both movements of the operating member relative to the body are permitted.

7 Claims, 12 Drawing Figures

ELECTRICAL SWITCHES

Matter enclosed in heavy brackets [ ] appears in the original patent but forms no part of this reissue specification; matter printed in italics indicates the additions made by reissue.

This invention relates to electrical switches.

A known electrical switch has a body including a base member apertured to receive a light source whereby the operating member of the switch or part thereof or part of the switch body can be illuminated from within the body. The known switch includes the facility of both axial and rotary movement of the operating member to operate contacts of the switch. It is desirable to be able to produce such known switches and similar switches without the axial or the rotary movement facility using the maximum number of common components and common assembly frequencies and it is an object of the present invention to facilitate such production.

An electrical switch according to the invention comprises a body, including a base, an operating member supported by the body for rotational and axial movement relative thereto, an aperture extending through the base and a light source support member received in said aperture, said support member and the wall of the aperture being so shaped that the support member can be located in the base in either of first and second different axial positions relative to the base, and the support member including a blocking element, which in the first axial location of the support member relative to the base, extends into the path of either axial or rotational movement of the operating member relative to the body to prevent such movement of the operating member relative to the body, the second location of the support member relative to the base being such that said blocking element lies out of the path of either axial or rotational movement of the operating member so that both movements of the operating member relative to the body are permitted.

Desirably, in both of said first and second locations of said support member relative to said base, axial and rotational movement of the support member relative to the base is resisted by engagement of abutting surfaces on the support member and the base, said support member being flexible to permit said abutting surfaces to be disengaged, and engagement of a light source in said support member preventing such flexure of the support member.

Conveniently the support member occupies different rotational positions relative to the base in the first and second axial locations respectively.

Desirably the rotational position occupied by the support member relative to the base in the first axial location of the support member relative to the base is spaced from the rotational position occupied by the support member relative to the base in the second axial location by 90°.

Desirably means is provided for retaining the support member in either of said rotational positions relative to the base.

Conveniently the light source which the support member is arranged to receive is one end of an optical cable.

One example of the invention is illustrated in the accompanying drawings, wherein.

Figure 2:
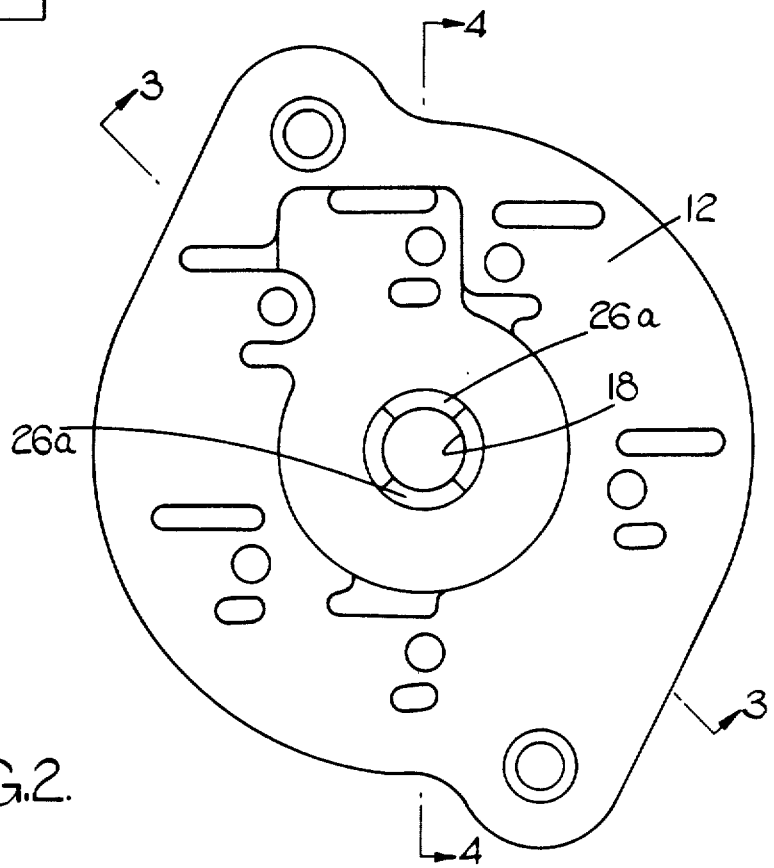
FIG. 2 is an enlarged diagrammatic representation of the base of the switch of FIG. 1.
Figure 3:
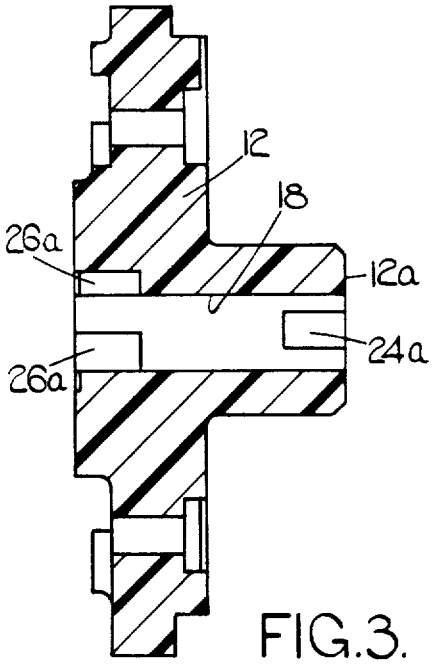
Figure 4:
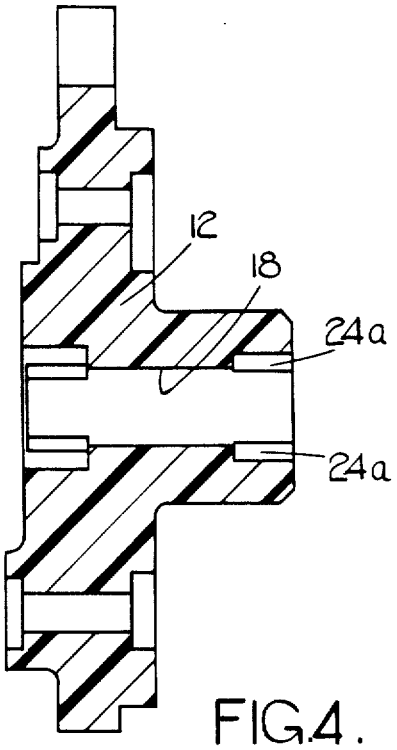
Figure 5:
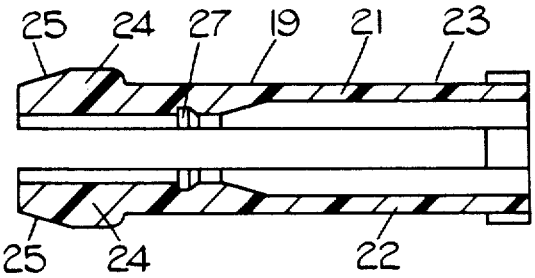
Figure 6:
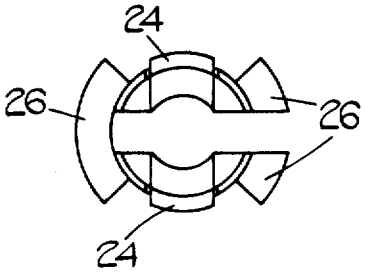
Figure 7:
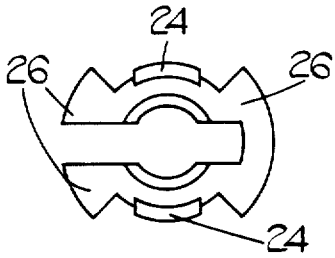
Figure 11:
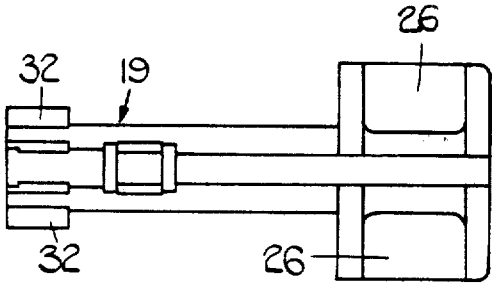
Figure 8:
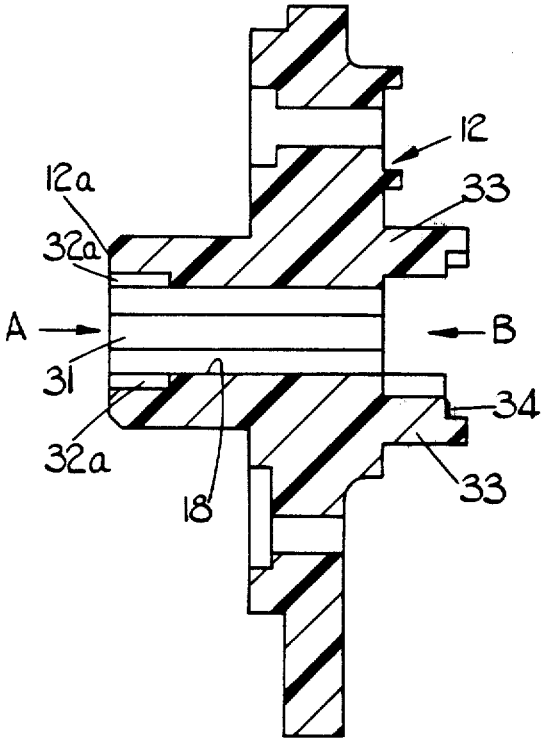
Figure 12:
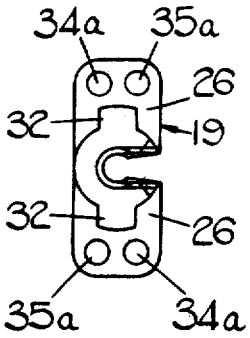
Figure 9:
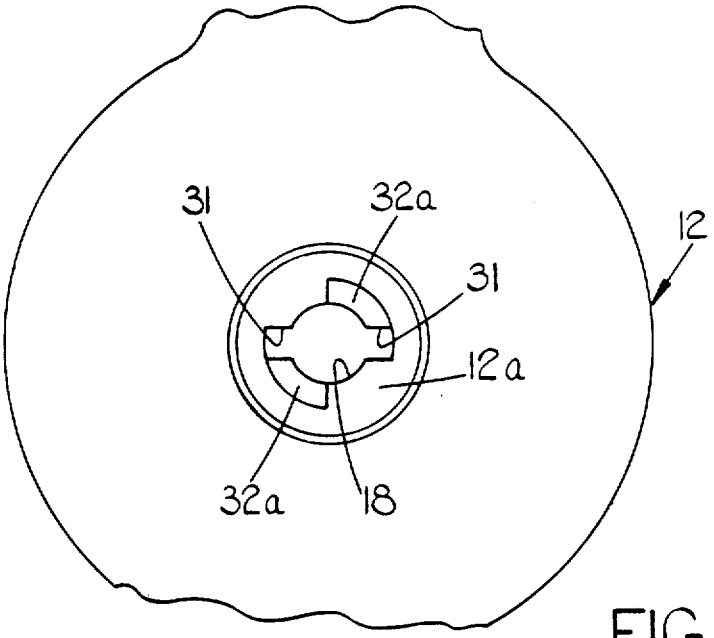
Figure 10:
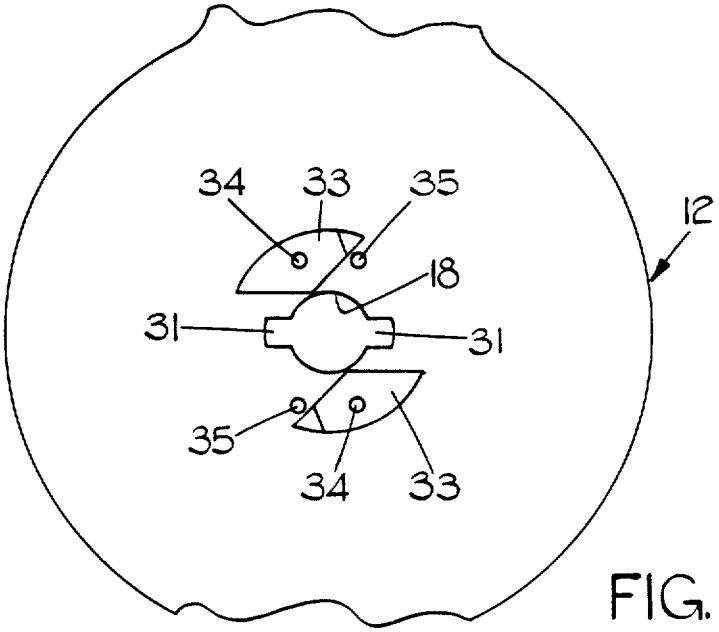

FIGS. 3 and 4 are sectional views on the lines 3—3 and 4—4 respectively in FIG. 2;

FIG. 5 is a longitudinal sectional view of a light source support member;

FIGS. 6 and 7 are opposite end views respectively of the support member of FIG. 5;

FIG. 8 is a view similar to FIG. 4 of a modification;

FIGS. 9 and 10 are views in the direction of arrows A and B respectively in FIG. 8 with certain details omitted; and FIGS. 11 and 12 are views similar to FIGS. 5 and 6 of light source support members for use in the base of FIGS. 8 to 10.

Referring to the drawings, the switch comprises a body 11 which is fixed in use, and which includes a moulded synthetic resin base 12. Rotatable within the body, and extending therefrom to facilitate manual operation, is a moulded synthetic resin operating member 13. The base 12 carries fixed electrical contacts 14 engageable by a movable electrical contact 15 rotatable with the operating member 13. The operating member 13 is capable of both rotational movement relative to the base 12 in a plane parallel to the base 12, and axial movement relative to the base 12 in the direction of the axis of rotation of the operating member relative to the base. The operating member 13 and the body 11 include first and second detent arrangements 16, 17 the detent arrangement 16 controlling the axial positions of the operating member 13, relative to the body, and the detent mechanism 17 defining the angular positions of the operating member relative to the body. The nature of the various sets of contacts controlled by the two movements of the operating member 13 relative to the body are of no importance to the present invention.

The base 12 is provided with a centrally disposed aperture, or bore 18 extending completely through the base parallel to the axis of rotational movement of the operating member 13. The bore 18 is a plane cylindrical bore intermediate its ends, but at its end includes a more complex shaping, the detail and purpose of which will be described hereinafter.

Engageable within the bore 18 is a light source support member 19 which is moulded in synthetic resin material and which is generally in the form of a cylindrical tube the outer diameter of which is substantially equal to the inner diameter of the cylindrical region of the bore 18 and the inner diameter of which is substantially equal to the outer diameter of the ferrule provided at one end of an optical cable. The member 19 is split axially to define first and second limbs 21, 22 which are substantially mirror images of one another, and are integrally interconnected at one end 23 only for the member 19. The ends 23 of the member 19 is the end which will be adjacent the exterior of the base 12 in use.

At their ends remote from the ends 23 of the member 19 the limbs 21, 22 each include a radially outwardly extending protuberance 24 the leading edge of which is tapered to define a ramp 25. At its end 23, the member 19 is provided with a diametrically opposed pair of radially outwardly extending quadrant shaped lugs 26 and as can be seen in FIGS. 6 and 7 one of the lugs 26 is split into two sections so that in effect the only part interconnecting the two limbs 21, 22 is the lug 26 which is not split. It will be recognised therefore that the limbs 21, 22 can be moved in such a direction that the gap between their free ends is increased this movement being permitted by flexure of the whole lug 26. However, additionally the member 19 can be flexed again by flexure of the whole lug 26 in a direction to increase or reduce the diameter of the member 19.

As can be seen in FIGS. 5 to 7 the protuberances 24 extend radially outwardly diametrically opposite one another as to the lugs. However, the lugs 26 are spaced from the protuberances 24 by 90° rotationally about the longitudinal axis of the member 19.

Figure 1:
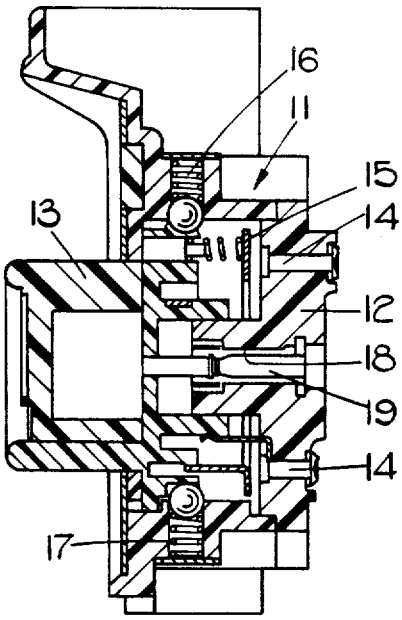
FIG. 1 is a diagrammatic sectional view of an electrical switch.

The outermost end of the bore 18 in the base 11 is formed with a pair of radial extensions defining recesses 26a in the outer surface of the base. The shaping of the recesses 26a conforms to the shaping of the lugs 26, and it will be recognised therefore that the member 19 can be inserted into the bore 18 and can be located angularly within the bore 18 such that the lugs 26 enter the recesses 26a. The length of the member 19 is such that when the lugs 26 are seated in the recesses 26a then the protuberances 24 of the limbs 21, 22 project beyond the innermost end of the bore 18, and thus the shoulders define at the trailing ends of the protuberances, 24 engage the inner surface 12a of the base 12. The co-operation between the lugs 26 and the recesses 26a prevent rotational movement of the member 19 relative to the base 12, and the engagement of the shoulders at the trailing ends of the protuberances 24 with the surface 12a of the base resists axial movement of the member 19 relative to the base. It is to be understood however that the member 19 can be removed from the bore 18 merely by flexing the limbs 21, 22 towards one another to disengage the shoulders of the protuberances 24 from the surface 12a. It will further be recognized however that when the ferrule 20 (FIG. 1) at one end of an optical cable is inserted into the support member 19 then the presence of the ferrule will prevent such inward flexure of the limbs 21, 22 and thus while the ferrule is present within the support member 19 the support member 19 cannot be moved axially or rotationally relative to the base 12.

As mentioned above when the lugs 26 of the member 19 are seated in the recesses 26a of the base 12, then the free ends of the limbs 21, 22 of the member 19 project inwardly from the inner surface 12a of the base. The free ends of the limbs 21, 22 define a blocking element extending into the path of axial movement of the operating member 13 relative to the body 11. Thus should an attempt be made to move the operating member 13 axially towards the base 12, then such movement of the operating member will be prevented by abutment of the operating member with the free ends of the limbs 21, 22. It is clear therefore that with the support member 19 in a fully inserted position wherein the lugs 26 are seated in the recesses 26a and the ferrule 20 is present within the member 19, the switch is capable only of operation as a rotary switch.

At the innermost end of the bore 18 in the base 12 and spaced around the circumference of the bore 18 by 90° from the recesses 26a is a diametrically opposed pair of axially extending grooves 24a. The depth of the grooves 24a is such that the protuberances 24 can be accommodated therein with the remainder of the length of the limbs 21, 22 engaging the cylindrical region of the bore 18. In order to position the support member 19 with the protuberances 24 engaged in the grooves 24a the ferrule 20 is first removed and the member 19 is partially withdrawn from the bore 18 as permitted by inward flexure of the limbs 21, 22. The member 19 is then rotated through 90° with respect to the base 12 so that the protuberances 24 align with the grooves 24a and into the grooves 24a by virtue of the inherent resilience of the member 19. In this position of course the lugs 26 are both axially and angularly spaced from the recesses 26a and the under surfaces of the lugs 26 now engage the outer surface of the base 12. The ferrule 20 is then reinserted into the support member 19 and again serves to prevent inward flexure of the limbs 21, 22. Thus in this position of the member 19 angular movement of the member 19 relative to the base 12 is prevented by the engagement of the protuberances 24 in the grooves 24a and axial movement of the member 19 relative to the base 12 is prevented in one direction by engagement of the lugs 26 with the outer surface of the base 12 and in the othe direction by engagement of the shoulders of the protuberances 24 with the ends of the grooves 24a. The axial length of the grooves 24a is equal to the axial length of the protuberances 24 and thus in this, the second axial position of the member 19 relative to the base 12 the free ends of the limbs 21, 22 are flush with the inner surface 12a of the base and thus do not impede axial movement of the operating member 13 towards the base 12.

The inner surface of the member 19 is shaped at 27 to conform to the ferrule 20, so that a latching effect is achieved between the ferrule and the member 19 when the ferrule is inserted. The latching effect is sufficient to resist a relatively low axial loading tending to withdraw the ferrule from the member 19, but of course upon application of a definite pulling force the ferrule 20 can be removed to permit movement of the member 19 relative to the base 12 between its first and second axial positions.

It will be recognised that in the foregoing description the locking element defined by the end regions of the limbs 21, 22 of the member 19 serve to block axial movement of the operating member 13 relative to the base 12. However, if desired by modification of the inter-relationship between the free ends of the limbs 21, 22 and the operating member 13, the member 19 in its first axial position can serve to prevent part or all of the otherwise possible rotational movement of the operating member 13 relative to the base 12, while permitting the axial movement of the operating member relative to the base 12.

In the modification shown in FIGS. 8 to 12 the light source support member 19 is arranged positively to be retained in the base 12 irrespective of whether or not a light source is engaged therein. The bore 18 is formed in its wall with a pair of axially extending grooves 31 which receive lugs 32 of the member 19 during insertion of the member 19 into the bore 18. At its inner end the wall of the bore 18 is formed with a diametrically opposed pair of segment shaped recesses 32a in which the lugs 32 of the member 19 can be received upon rotation of the member 19 within the bore 18. When the lugs 32 engage in the recesses 32a withdrawal of the member 19 is resisted and reverse rotation of the member 19 to realign the lugs 32 with the grooves 31 is resisted by engagement of pips 34 on the outer faces of projections 33 of the base in dimples 34a in lugs 26 of the member 19. The height of the projections 33 is equal to the depth of the recesses 32a and the member 19 is alternatively engageable with the base in axial position such that the lugs 32 project beyond the end of the bore 18 rather than being housed in the recesses 32a. To achieve this alternative position of the member 19 relative to the base 12 the member 19 is inserted through the bore 18 until the lugs 26 engage the outer face of the base 12 between the projections 33 and the lugs 32 project from the inner end of the bore 18. The member 19 is then rotated to engage the lugs 32 with the surface 12a of the base to resist withdrawal of the member 19. Reverse rotation of the member 19 to re-align the lugs 32 with the grooves 31 is resisted by engagement of pips 35, on the base 12 between the projections 33, in dimples 35a in the lugs 26. Thus the member 19 has two alternative axial positions relative to the base 12 and in both positions withdrawal of the member 19 is resisted by the lugs 32. Similarly unintentional rotation of the member 19 in either of its axial positions, to permit withdrawal is resisted by interengagement of dimples on the lugs 26 and projections on the outer face of the base 12. The operation of a switch incorporating this modification is as described with reference to FIGS. 1 to 7.

Moreover, while in the examples described above the light source to be received within the light source support member 19 is the ferrule of one end of an optical cable, it is to be understood that the light source could be a bulb holder containing an incandescent bulb.

It can be seen therefore that in effect two basic switches can be manufactured using the same components. The first switch has the facility for both rotational and axial movement of the operating member, that is to say when the support member 19 occupies its second axial position, whereas the second switch defined by the member 19 being in its first axial position, has a restricted facility of movement of the operating member 13 relative to the base.

I claim:

1. An electrical switch comprising a body including a base, an operating member supported by the body for rotational and axial movement relative thereto, an aperture extending through the base and a light source support member received in said aperture, said support member and the wall of the aperture being so shaped that the support member can be located in the base in either of first and second different axial positions relative to the base, and the support member including a blocking element, which in the first axial location of the support member relative to the base, extends into the path of either axial or rotational movement of the operating member relative to the body to prevent such movement of the operating member relative to the body, the second location of the support member relative to the base being such that said blocking element lies out of the path of either axial or rotational movement of the operating member so that both movements of the operating member relative to the body are permitted.

2. An electrical switch as claimed in claim 1 wherein both of said first and second locations of said support member relative to said base, axial and rotational movement of the support member relative to the base is resisted by engagement of abutting surfaces on the support member and the base, said support member being flexible to permit said abutting surfaces to be disengaged, and engagement of a light source in said support member preventing such flexure of the support member.

3. An electrical switch as claimed in claim 1 or claim 2 wherein the support member occupies different rotational positions relative to the base in the first and second axial locations respectively.

4. An electrical switch as claimed in claim 3 wherein the rotational position occupied by the support member relative to the base in the first axial location of the support member relative to the base is spaced from the rotational position occupied by the support member relative to the base in the second axial location by 90°.

5. An electrical switch as claimed in claim 3 wherein means is provided for retaining the support member in either of said rotational positions relative to the base.

6. An electrical switch as claimed in claim 4 wherein means is provided for retaining the support member in either of said rotational positions relative to the base.

7. An electrical switch as claimed in claim 1 or claim 2 wherein the light source which the support member is arranged to receive is one end of an optical cable.

* * * * *